(12) United States Patent
Tsai (10) Patent No.: US 10,066,805 B1
(45) Date of Patent: Sep. 4, 2018

(54) MULTI-FUNCTION VEHICLE LIGHT ASSEMBLY

(71) Applicant: Optronics International, LLC, Tulsa, OK (US)

(72) Inventor: Kevin His-Hsien Tsai, Tainan (TW)

(73) Assignee: Optronics International, LLC, Tulsa, OK (US)

( * ) Notice: Subject to any disclaimer, the term of this patent is extended or adjusted under 35 U.S.C. 154(b) by 0 days.

(21) Appl. No.: 15/433,290

(22) Filed: Feb. 15, 2017

Related U.S. Application Data (60) Provisional application No. 62/301,276, filed on Feb. 29, 2016.

(51) Int. Cl.
| | |
|---|---|
| *F21V 1/00* | (2006.01) |
| *F21S 43/247* | (2018.01) |
| *F21S 8/10* | (2006.01) |
| *F21S 43/20* | (2018.01) |
| *F21S 43/14* | (2018.01) |
| *F21Y 115/10* | (2016.01) |
| *F21Y 105/18* | (2016.01) |

(52) U.S. Cl.
CPC ............ *F21S 43/247* (2018.01); *F21S 43/14* (2018.01); *F21S 43/26* (2018.01); *F21S 48/215* (2013.01); *F21S 48/2212* (2013.01); *F21S 48/2287* (2013.01); *F21Y 2105/18* (2016.08); *F21Y 2115/10* (2016.08)

(58) Field of Classification Search
CPC .. F21S 48/2287; F21S 48/215; F21S 48/2212; F21S 43/247; F21S 43/14; F21S 43/26; F21Y 2105/18; F21Y 2115/10

USPC ......................... 362/509, 510, 520, 522, 544
See application file for complete search history.

(56) References Cited

U.S. PATENT DOCUMENTS

| | | | |
|---|---|---|---|
| 5,567,036 A * | 10/1996 | Theobald | B60Q 1/2607 362/485 |
| 7,674,026 B2 | 3/2010 | Uchida et al. | |
| 8,441,194 B2 | 5/2013 | Huang | |
| 9,010,975 B2 | 4/2015 | Norris et al. | |
| 2006/0098440 A1 * | 5/2006 | Allen | F21V 3/00 362/294 |
| 2012/0044669 A1 * | 2/2012 | Ogata | F21K 9/90 362/97.3 |
| 2012/0229027 A1 * | 9/2012 | Huang | B60Q 1/2607 315/80 |
| 2012/0287613 A1 * | 11/2012 | Hamel | F21V 29/004 362/184 |
| 2014/0268858 A1 * | 9/2014 | Norris | F21S 48/22 362/545 |

(Continued)

*Primary Examiner* — Karabi Guharay
*Assistant Examiner* — Glenn Zimmerman
(74) *Attorney, Agent, or Firm* — Head, Johnson, Kachigian & Wilkinson, PC (57) ABSTRACT

A multi-function vehicle light assembly. The light assembly includes a substantially enclosed housing body with an open top. A lens covers the open top, the lens having a first red lens portion and an adjacent second clear lens portion. A first LED array generates red light for vehicle tail lighting, with the first array located beneath the first lens portion. A second LED array generates red light for vehicle brake lighting, with the second array located beneath the first lens portion. A third LED array generates white light for vehicle back-up lighting, with the third array located beneath the second lens portion.

17 Claims, 13 Drawing Sheets

(56) References Cited

U.S. PATENT DOCUMENTS

| | | | | |
|---|---|---|---|---|
| 2014/0334149 A1* | 11/2014 | Nolan | ................... | F21V 5/007 362/235 |
| 2015/0137965 A1* | 5/2015 | Lanham | ............... | B60Q 1/2607 340/479 |

* cited by examiner

MULTI-FUNCTION VEHICLE LIGHT ASSEMBLY

CROSS-REFERENCE TO RELATED APPLICATIONS

This application claims priority to and the benefit of U.S. Provisional Patent Application Ser. No. 62/301,276, filed Feb. 29, 2016, which is herein incorporated in its entirety by reference.

BACKGROUND OF THE INVENTION

1. Field of the Invention

This invention relates generally to a multi-function vehicle light assembly, and more particularly, but not by way of limitation, to a multi-function vehicle light assembly which combines and integrates vehicle tail lighting, vehicle brake lighting, and vehicle back-up lighting in a single integrated unit.

2. Description of the Related Art

Various types of lights are utilized on motor vehicles for various purposes.

The rear of a vehicle includes a tail light which is illuminated when the vehicle lighting system is operational. A stop or brake light is utilized when brakes on the vehicle are engaged. In addition, a rear turn light is utilized for left or right turns. Finally, a back-up or reverse light is illuminated when the vehicle is placed into reverse operating mode.

It is desirable to incorporate each of these lighting functions into a single light or into a pair of lights.

It is also desirable to provide a multi-function vehicle light assembly that maximizes the functions while minimizing the space.

It is also desirable to provide a multi-function vehicle light assembly that may be installed as part of original vehicle equipment or may be installed as after-market equipment.

Various government safety regulations specify the minimum amount of illuminated surface area. Accordingly, it is desirable to maximize the illuminated area while minimizing the total area of the light assembly.

SUMMARY OF THE INVENTION

The present invention is directed to a multi-function vehicle light assembly. The vehicle light assembly includes a substantially enclosed body housing having an open top which is covered by a main outer clear lens.

In one preferred embodiment of the vehicle light assembly, a first red lens portion fits on or within the open top of the housing. Adjacent to the first red lens portion is a second clear lens portion on or within the open top of the housing. The second clear lens portion has a plurality of radially extending fingers which act as light projection guides in order to transmit light.

A printed circuit board (PCB) fits within the housing body beneath the first red lens portion and beneath the second clear lens portion. Arranged on the printed circuit board are at least three LED (light emitting diode) arrays generating light, each LED array having a plurality of LEDs.

A first LED array is beneath the first red lens portion so that light emitted or projecting from the first LED array passes through the first red lens portion and then through the clear outer lens. The first LED array may be used for and function to provide vehicle tail lighting.

A second LED array is arranged on the printed circuit board also beneath the first red lens portion. The second LED generates red light through the first red lens portion and then through the clear outer lens. The second LED array may be used for and functions to provide vehicle brake lighting and, additionally, to provide turn signal lighting.

The radially extending fingers of the second clear lens portion extend at least partially beneath the first red lens portion. Each of the fingers terminates over or on top of one of the LEDs in the second LED array. Accordingly, when the second red light LED array is activated, a portion of the red light is projected toward the second clear lens portion.

A third LED array comprises a plurality of light LEDs. The third LED array generates white light and is located beneath the second clear lens portion. The third LED array may be used for and functions to provide vehicle back-up or reverse lighting.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
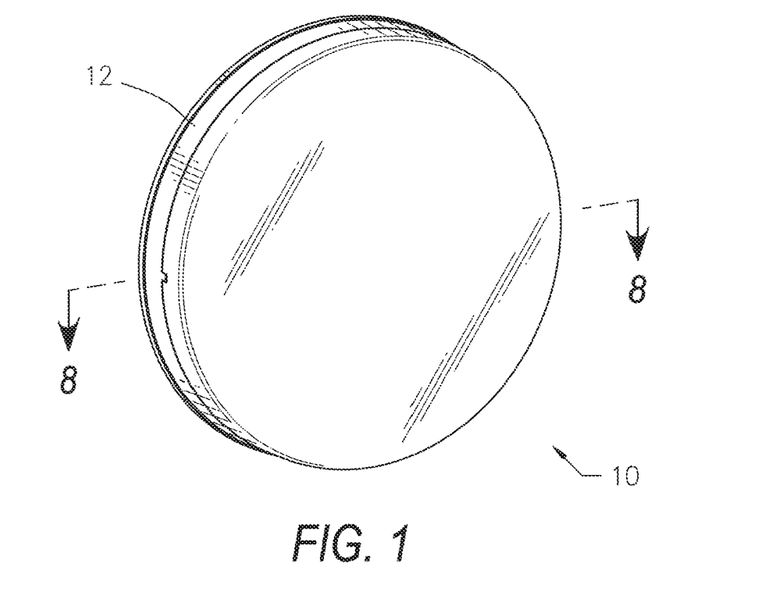
FIG. 1 illustrates a front perspective view and FIG. 2 illustrates a rear perspective view of a first preferred embodiment of a multi-function vehicle light assembly constructed in accordance with the present invention.

Referring to the drawings in detail, FIG. 1 illustrates a front perspective view of a first preferred embodiment of a multi-function vehicle light assembly 10 having a substantially circular or cylindrical exterior. Other exterior configurations are possible.

The multi-function light assembly 10 is particularly adapted for use as a rear vehicle light, although other uses are possible.

Figure 2:
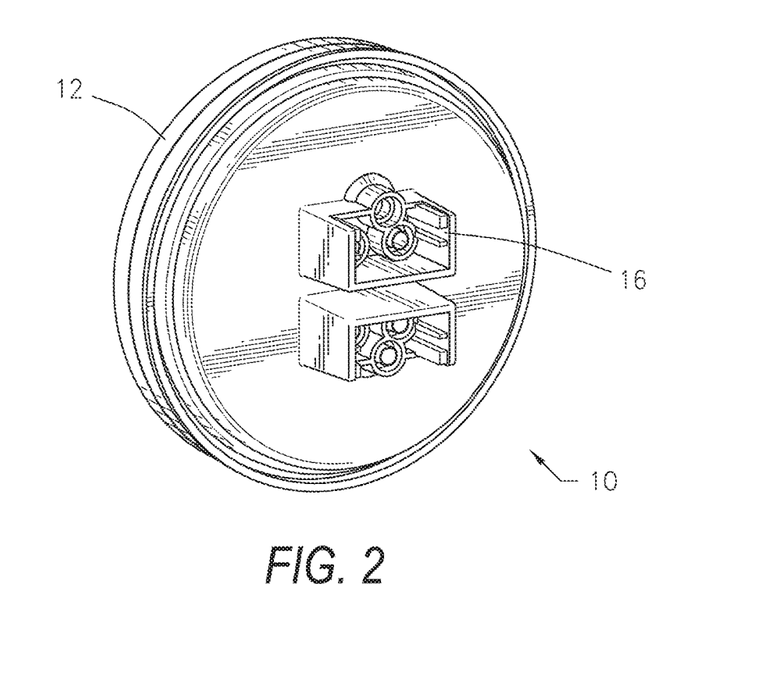

FIG. 2 illustrates a rear perspective view of the light assembly 10 shown in FIG. 1. Modular connectors 16 incorporate wires which extend through the housing body 12 to supply electrical power from and connect to a vehicle electrical system (not shown). The modular connectors 16 connect with corresponding connectors to make electrical connection.

Figure 3:
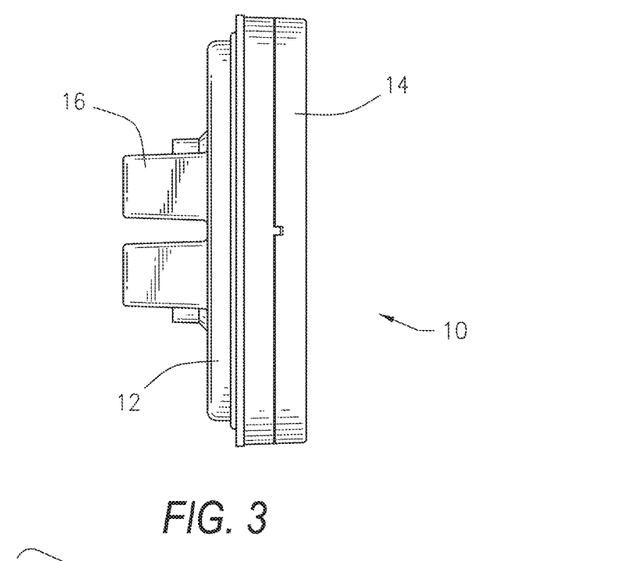
FIG. 3 illustrates a side view of the light assembly shown in FIG. 1.

FIG. 3 illustrates a side view of the light assembly 10. The light assembly 10 includes a substantially enclosed body housing 12.

Figure 4:
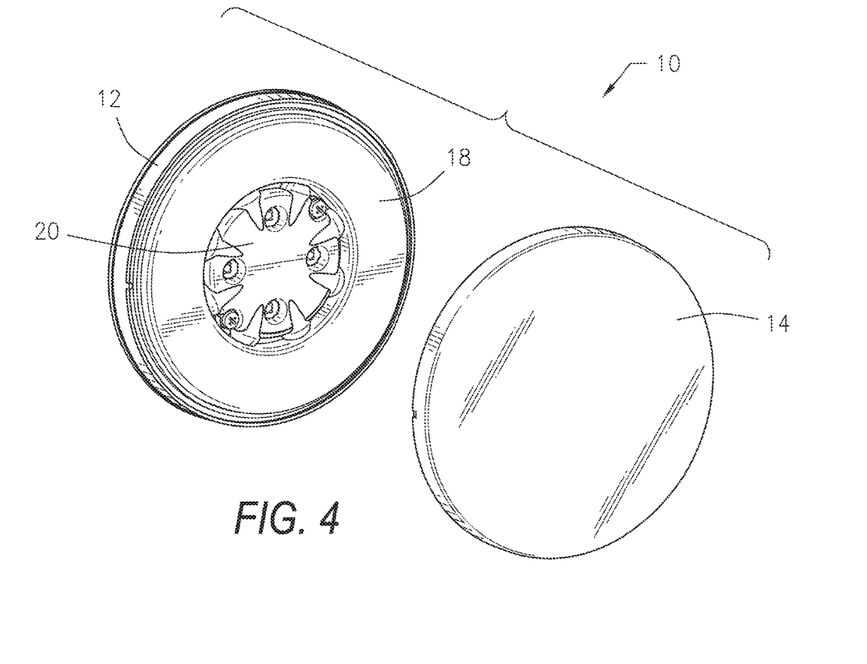
FIGS. 4 and 5 illustrate alternate partially exploded views of the light assembly shown in FIG. 1.

FIG. 4 illustrates a main, outer clear lens 14 exploded from the vehicle light assembly 10. The housing body 12 includes a bottom and cylindrical walls so that the body is substantially closed with an open top which is covered by the main outer lens 14. Accordingly, a vehicle light assembly is provided within a sealed enclosure.

A first red lens portion 18 fits on or within the open top of the housing body 12. The first red lens portion is translucent to permit light to pass therethrough. In the embodiment shown, the first red lens portion 18 forms a circular ring with a center opening. Adjacent to and within the first red lens portion 18 is a second clear lens portion 20. The second clear lens portion 20 is translucent to permit light to pass therethrough.

Figure 5:
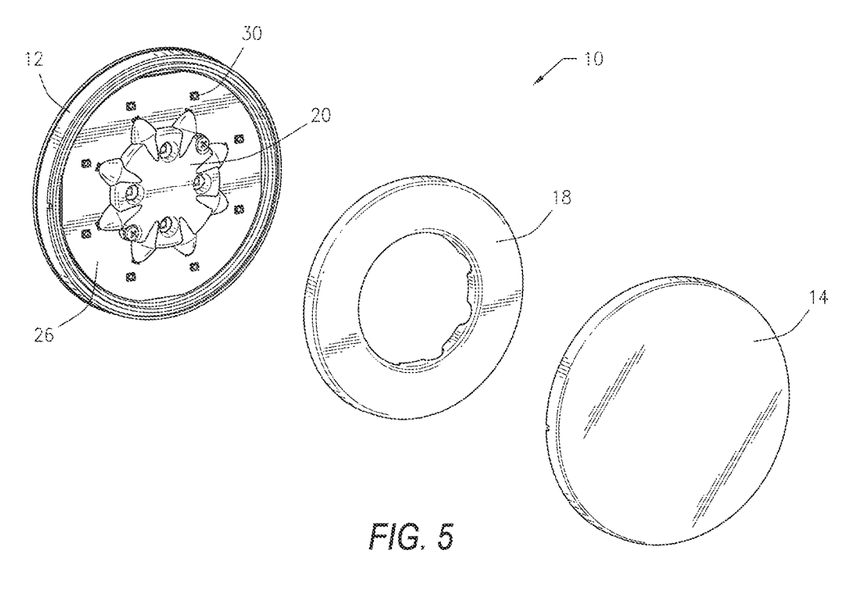

FIG. 5 illustrates a partially exploded view with the first red lens portion 18 exploded from the light assembly 10. The second clear lens portion 20 has a substantially circular exterior edge with a diameter slightly less than the inner diameter of the center opening of the first red lens portion 18. The second clear lens portion 20 also has a plurality of radially extending fingers 22 which project from the circular exterior edge and which act as light projection guides in order to transmit light.

Figure 6:
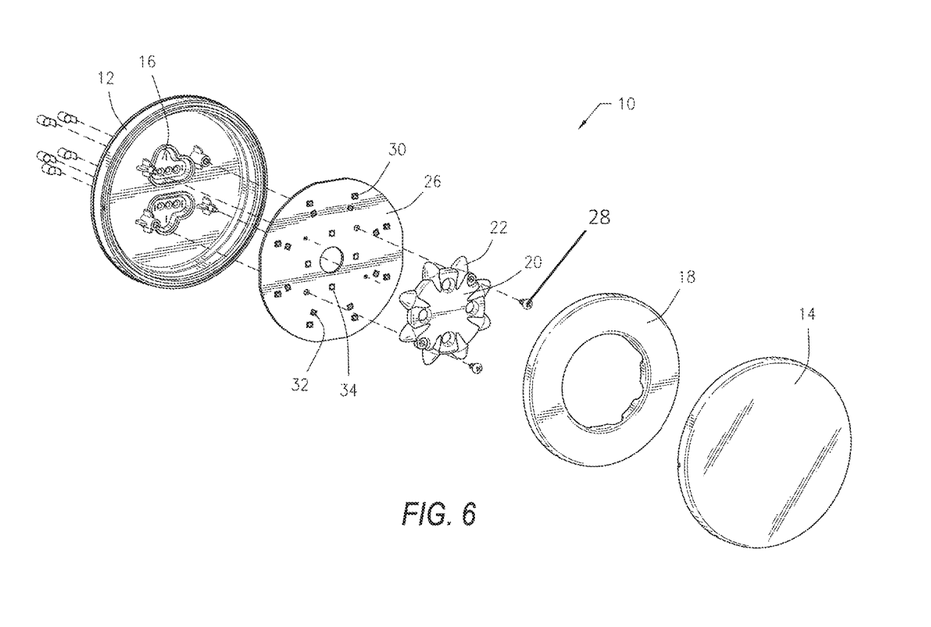
FIG. 6 illustrates a front exploded view and FIG. 7 illustrates a rear exploded view of the light assembly shown in FIG. 1.
Figure 7:
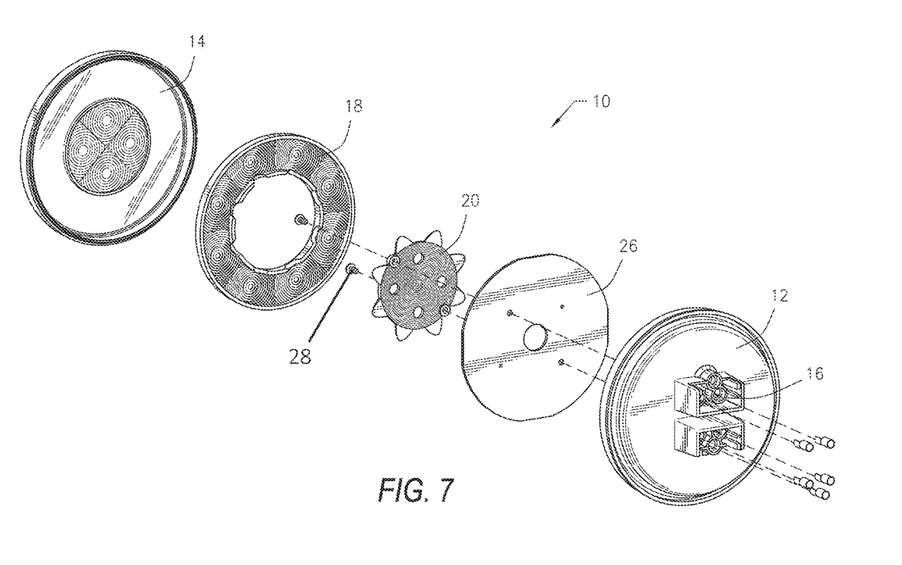
Figure 8:
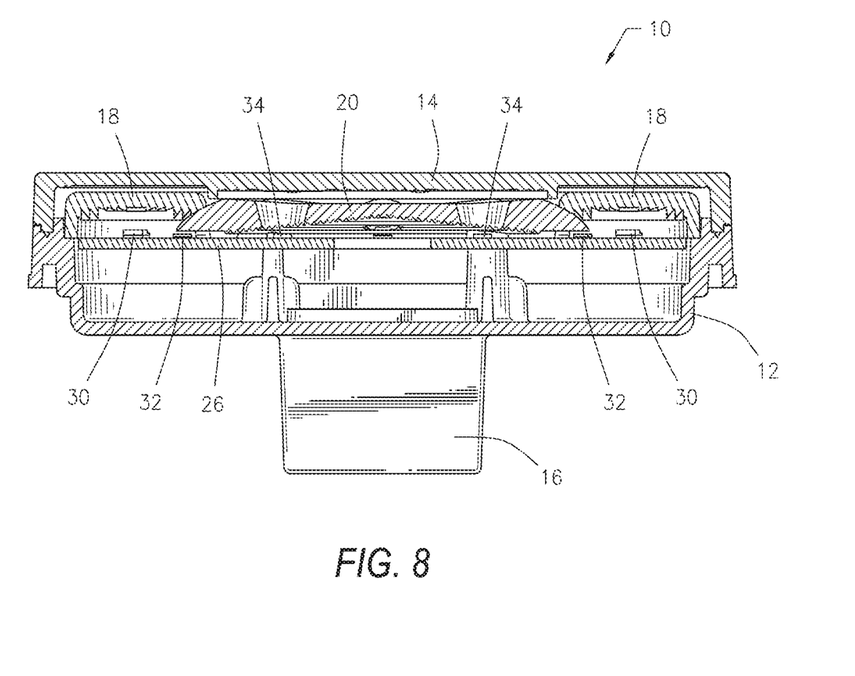
FIG. 8 illustrates a sectional view taken along section line 8-8 of FIG. 1.

FIG. 6 illustrates a front exploded view of the light assembly 10 while FIG. 7 illustrates a rear exploded view of the light assembly 10.

A printed circuit board (PCB) 26 fits and is enclosed within the housing body 12 beneath the first red lens portion 18 and beneath the second clear lens portion 20. The printed circuit board 26 may be fastened with fasteners 28 or otherwise secured inside the housing 12. Arranged on the printed circuit board 26 are at least three LED (light emitting diode) arrays each generating light. As will be described in detail, each LED array includes a plurality of individual LEDs.

Figure 16:
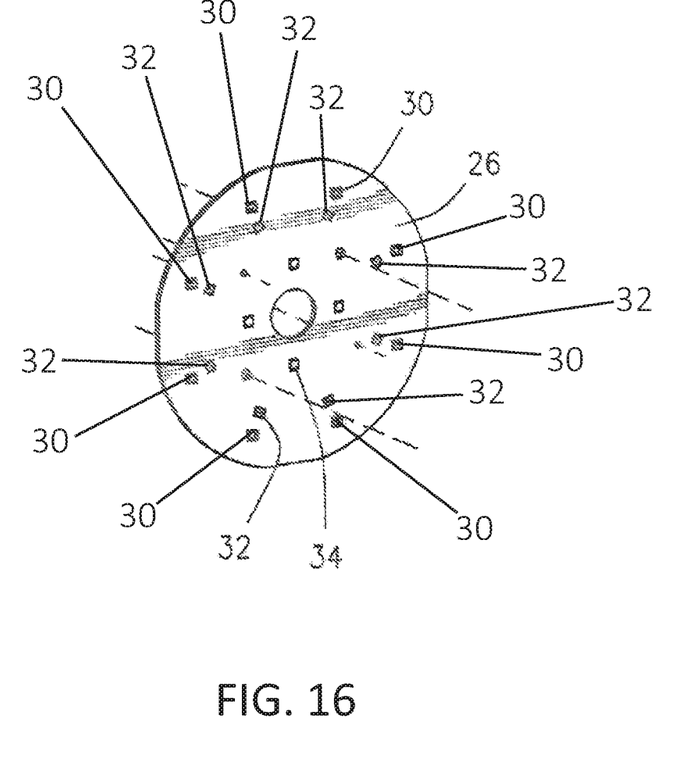
FIG. 16 illustrates an enlarged view of a printed circuit board which is a part of the light assembly in FIGS. 6 and 7.

FIG. 16 illustrates the printed circuit board 26 apart from the assembly 10.

Fasteners 28 passing through the second lens 20, through the circuit board 26, and into the housing body 12 retain them in place.

A first LED array 30 emits red light and is arranged substantially in a circular pattern on the printed circuit board 26 farthest from the center of the light assembly 10.

In the present embodiment, the first LED array 30 comprises eight separate LEDs, arranged in a somewhat circular pattern; however, a greater or lesser number may be employed within the spirit and scope of the invention. The first LED array 30 is beneath the first red lens portion 18 so that light emitted or projecting from the first LED array 30 passes through the first red lens portion 18, and then through the clear outer lens 14 in order to provide a circular ring of red light. The first LED array 30 may be used for and functions to provide vehicle tail lighting. The first LED array 30 is connected to the vehicle lighting system (not shown) so that red light is generated.

A second LED array 32 is arranged on the printed circuit board 26 in a somewhat circular pattern having a diameter less than the first LED array 30. The second LED array 32 is also arranged beneath the first red lens portion 18. The second LED array 32 comprises eight separate LEDs, however, a greater or lesser number may be employed. Light generated or projected from the second LED array 32 generates red light through the first red lens portion 18, and then through the clear outer lens 14. The second LED array 32 may be used for and functions to indicate and provide vehicle brake lighting and, additionally, provide and indicate turn signal lighting. The second LED array 32 is connected to the vehicle lighting system (not shown) so that red light is generated.

The radially extending fingers 22 of the second clear lens portion 20 extend at least partially beneath the first red lens portion 18. Each extending finger 22 terminates at least partially over or partially on top of one of the LEDs in the second LED array 32. Accordingly, when the second red light LED array 32 is activated, a portion of the red light is projected toward the second clear lens portion 20. Thus, when the second LED array 32 is activated in response to vehicle braking or in response to turn signal activation, the red light beneath the first lens portion 18 is increased and red light is also directed to the second lens portion 20. The red light projected using the fingers 22 extends the range and the area of the illuminated area.

A third LED array 34 comprises a plurality of white LEDs. The third LED array 34 generates white light and is located at the center-most portion of the housing body 12. In the present embodiment, four light LEDs comprise the third LED array 34, although a greater or lesser number may be employed. The third LED array 34 generates white light and is located beneath the second clear lens portion 20. The third LED array 34 may be used for and functions to provide vehicle back-up or reverse lighting. The third LED array 34 is connected to the vehicle lighting system (not shown) so that white light is generated.

FIGS. 9 through 15 illustrate a second preferred embodiment of a multi-function vehicle light assembly 50 having a substantially oval or elliptical exterior. Other exterior configurations are possible.

Figure 9:
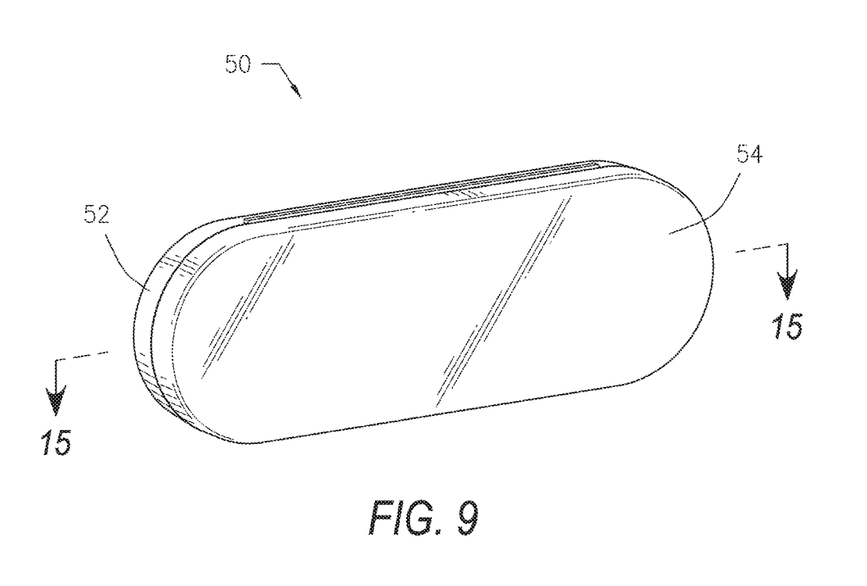
FIG. 9 illustrates a front perspective view and FIG. 10 illustrates a rear perspective view of a second preferred embodiment of the vehicle light assembly of the present invention.
Figure 10:
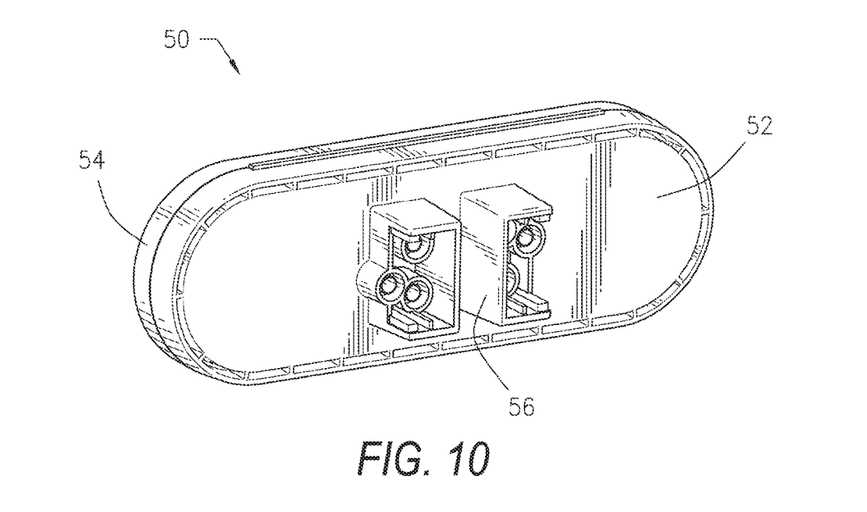

FIG. 9 illustrates a front perspective view while FIG. 10 illustrates a rear perspective view of the light assembly 50.

Figure 11:
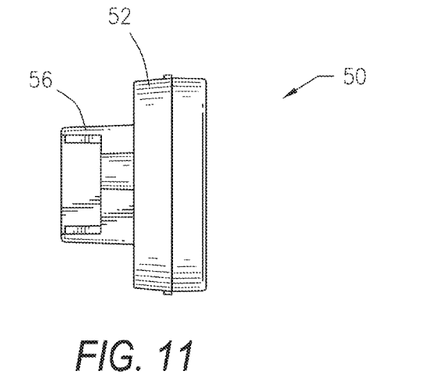
FIG. 11 illustrates a side view of the vehicle light assembly shown in FIG. 9.

FIG. 11 illustrates a side view of the light assembly 50. The light assembly 50 includes a substantially enclosed housing body 52 having a bottom and cylindrical walls with an open top which is covered by a main, outer clear lens 54. Accordingly, a vehicle light assembly 50 is provided within a sealed enclosure. Modular connectors 56 incorporate wires which extend through the housing body 52 to supply electrical power from and connect to a vehicle electrical system (not shown).

Figure 12:
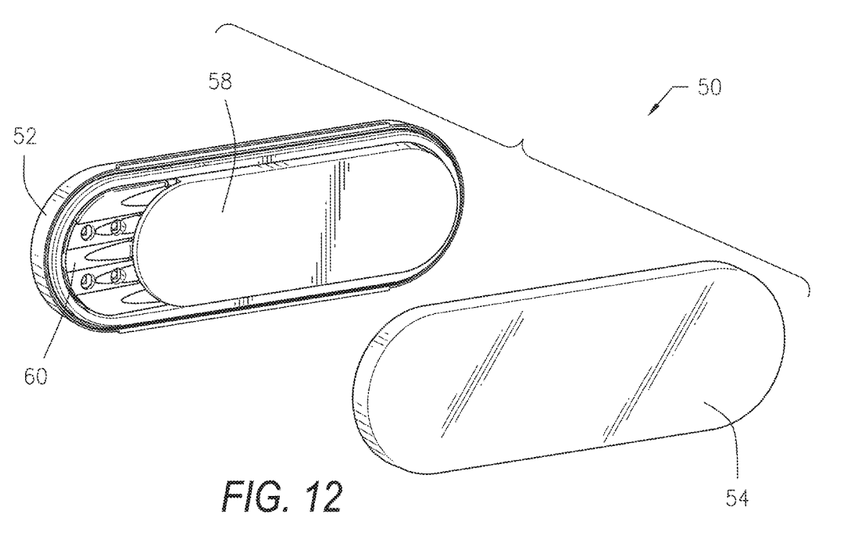
FIG. 12 illustrates a partially exploded view of the vehicle light assembly shown in FIG. 9.

FIG. 12 illustrates the main, outer clear lens 54 exploded from the vehicle light assembly 50.

A first red lens portion 58 fits on or within the open top of the housing body 52. The first lens portion is translucent to permit light to pass therethrough. In the embodiment shown, the first red lens portion 58 is somewhat in the form of an oval. Adjacent to and to the side of the first red lens portion 58 is a second clear lens portion 60. A portion of the second clear lens portion 60 is beneath the first red lens portion.

Figure 13:
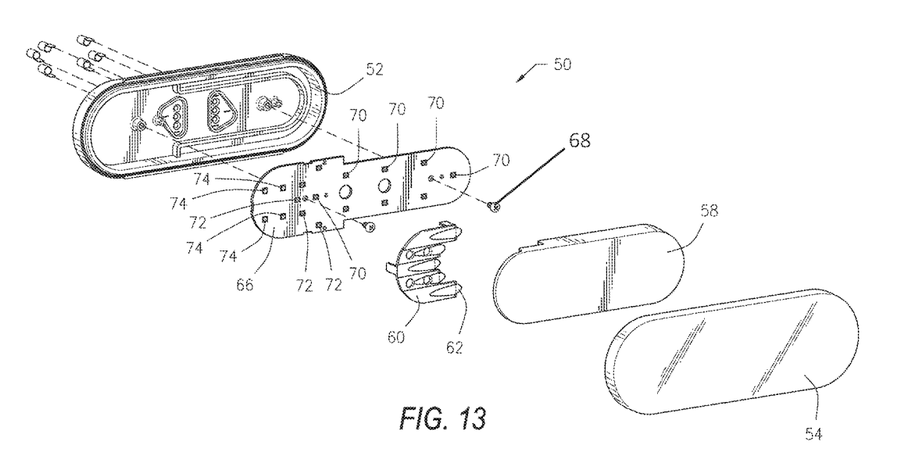
FIG. 13 illustrates an exploded front perspective view and FIG. 14 illustrates an exploded rear perspective view of the vehicle light assembly shown in FIG. 9.
Figure 14:
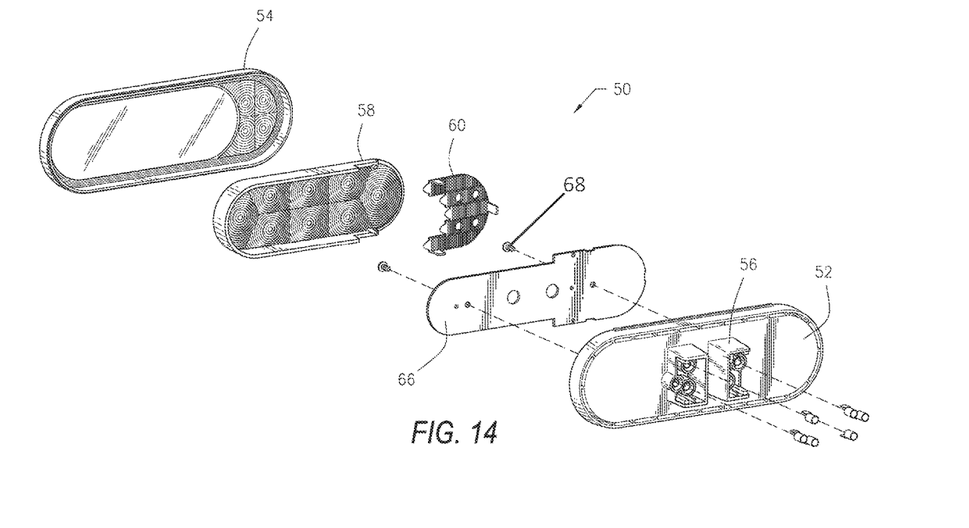

FIG. 13 illustrates a front exploded view of the light assembly 50 while FIG. 14 illustrates a rear exploded view of the light assembly 50.

The second clear lens portion 60 has a plurality of extending fingers 62 which act as light projection guides in order to transmit light.

A printed circuit board (PCB) 66 fits and is enclosed within the housing body 52 beneath the first red lens portion 58 and beneath the second clear lens portion 60. The printed circuit board 66 may be fastened with fasteners 68 or otherwise secured inside the housing 52.

Arranged on the printed circuit board 66 are at least three LED (light emitting diode) arrays each generating light. Each LED array includes a plurality of individual LEDs.

Figure 17:
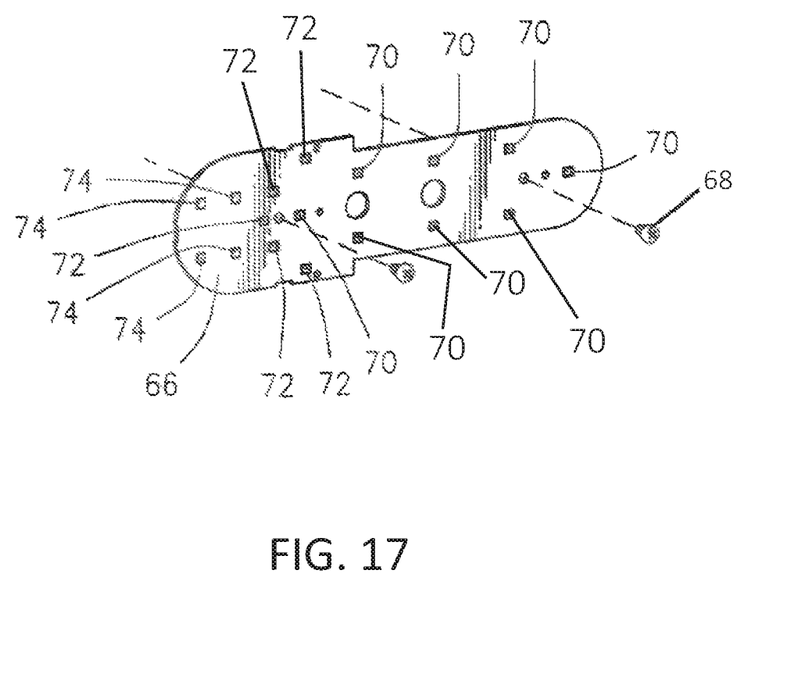
FIG. 17 illustrates an enlarged view of a printed circuit board which is a part of the light assembly in FIGS. 13 and 14.

FIG. 17 illustrates the printed circuit board 66 apart from the assembly 10.

Figure 15:
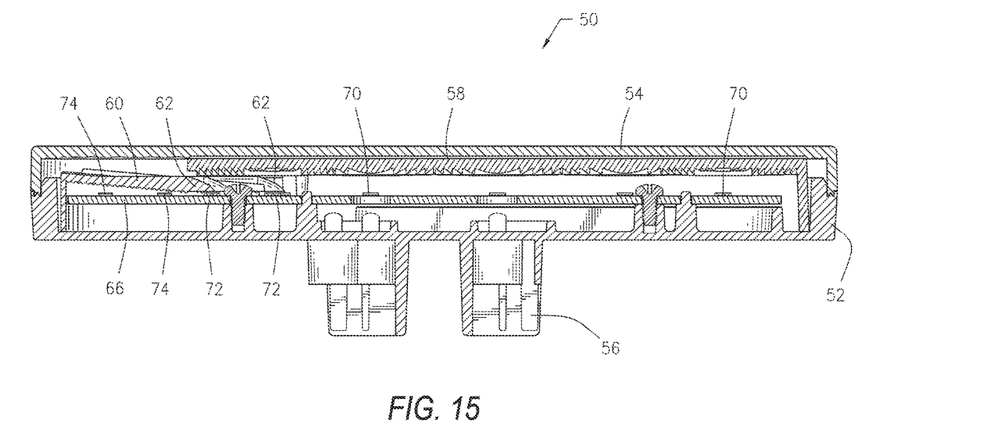
FIG. 15 illustrates a sectional view taken along section line 15-15 of FIG. 9.

As best seen in FIGS. 13 and 15, a first red LED array 70 comprises seven separate LEDs, however, a greater or lesser number may be used within the spirit and scope of the invention. The first red LED array 70 is beneath the first red lens portion 58 so that light emitted or projecting from the first LED array 70 passes through the first red lens portion 58, and then through the clear outer lens 54 in order to provide red light. The first LED array 70 may be used for and functions to provide vehicle tail lighting. Stated in other words, when the vehicle lighting system is activated, the first LED array is illuminated.

A second LED array 72 is arranged on the printed circuit board 66 adjacent to the first LED array 70. The second LED array 72 is also beneath the first red lens portion 58. The second LED array 72 comprises five separate LEDs, however, a greater or lesser number may be employed. The second LED array 72 generates red light through the first red lens portion 58, and then through the clear outer lens 54 in order to provide red light. The second LED array 72 may be used for and functions to provide brake lighting and, additionally, to provide turn signal lighting. Stated in other words, when the vehicle brakes are engaged, the second LED array 72 is illuminated. In addition, or separately therefrom, when a turn signal is engaged, the second LED array will flash.

The extending fingers 62 of the second clear lens portion 60 extend at least partially beneath the first red lens portion 58. Each extending finger 62 terminates at least partially over or partially on top of one of the LEDs in the second LED array 72. Accordingly, when the second red light LED array 72 is activated, a portion of the red light is projected toward the second clear lens portion 60. Thus, when the second LED array 72 is activated in response to vehicle braking or in response to turn signal activation, the red light beneath the first red lens portion 58 is increased and red light is also directed to the second lens portion 60. The red light projected using the fingers 62 extends the range and the area of the illuminated area.

The surface area illuminated by the second LED array 72 is thus increased.

A third LED array 74 comprises a plurality of white light LEDs. In the present embodiment, four LEDs comprise the third LED array 74, although a greater or lesser number may be employed. The third LED array 74 generates white light beneath the second clear lens portion 60. The third LED array 74 may be used for and functions to provide vehicle back-up or reverse signal lighting. Thus, when the third LED array 74 is activated in response to vehicle back-up, the white light passes through the second clear lens portion 60 and then through the clear outer lens 14.

The present invention provides a compact light assembly design which includes vehicle tail lighting, vehicle brake lighting, vehicle turn signal lighting, and vehicle reverse or back-up lighting.

The present invention maximizes the illuminated area of the various functions, while minimizing the total space or area of the light assembly.

Whereas, the devices and methods have been described in relation to the drawings and claims, it should be understood that other and further modifications, apart from those shown or suggested herein, may be made within the spirit and scope of this invention.

What is claimed is:

1. A multi-function vehicle light assembly, said light assembly including a substantially enclosed housing body with an open top, said assembly comprising:
   a lens covering said open top, said lens having at least a first lens portion and an adjacent second lens portion;
   a first LED array having a plurality of LEDs generating red light for vehicle tail lighting, said first array beneath said first lens portion;
   a second LED array having a plurality of LEDs generating red light for vehicle brake lighting, said second array beneath said first lens portion; and
   a third LED array having a plurality of LEDs generating white light for vehicle back-up lighting, said third array beneath said second lens portion; and
   wherein said second lens portion includes extending light projection guides to transmit light from said second LED array and wherein said light projection guides extend at least partially over each LED of said second LED array.

2. The multi-function vehicle light assembly as set forth in claim 1 wherein said first lens portion is red and wherein said second lens portion is clear.

3. The multi-function vehicle light assembly as set forth in claim 1 wherein said first lens portion is clear and wherein said second lens portion is clear.

4. The multi-function vehicle light assembly as set forth in claim 1 wherein said housing body and said lens are substantially circular.

5. The multi-function vehicle light assembly as set forth in claim 1 wherein said housing body and said lens are substantially oval.

6. The multi-function vehicle light assembly as set forth in claim 1 including an outer clear lens covering both said first lens portion and said adjacent second lens portion.

7. The multi-function vehicle light assembly as set forth in claim 1 wherein said first LED array, said second LED array, and said third LED array are each arranged on a printed circuit board in said housing body.

8. The multi-function vehicle light assembly as set forth in claim 4 wherein said first lens portion is a circular ring and said second lens portion is within said ring.

9. The multi-function vehicle light assembly as set forth in claim 7 wherein said first LED array includes a plurality of LEDs arranged in a circular pattern.

10. The multi-function vehicle light assembly as set forth in claim 7 wherein said first LED array includes a plurality of LEDs arranged in an oval pattern.

11. The multi-function vehicle light assembly as set forth in claim 9 wherein said second LED array includes a plurality of LEDs arranged in a circular pattern, having a diameter less than said circular pattern of said first LED array.

12. A multi-function vehicle light assembly, said light assembly including a substantially enclosed housing body with an open top, said assembly comprising:
- a lens covering said open top, said lens having at least a first lens portion and an adjacent second lens portion;
- a first LED array generating red light for vehicle tail lighting, said first array beneath said first lens portion;
- a second LED array generating red light for vehicle brake lighting, said second array beneath said first lens portion;
- a third LED array generating white light for vehicle back-up lighting, said third array beneath said second lens portion; and
- wherein said second lens portion includes extending light projection guides and wherein said light projection guides of the second lens portion are at least partially beneath the first lens portion.

13. The multi-function vehicle light assembly as set forth in claim 12 wherein said first lens portion is red and wherein said second lens portion is clear.

14. The multi-function vehicle light assembly as set forth in claim 12 wherein said first lens portion is clear and wherein said second lens portion is clear.

15. The multi-function vehicle light assembly as set forth in claim 12 wherein said housing body and said lens are substantially circular.

16. The multi-function vehicle light assembly as set forth in claim 12 wherein said first lens portion is a circular ring and said second lens portion is within said ring.

17. The multi-function vehicle light assembly as set forth in claim 12 wherein said housing body and said lens are substantially oval.

* * * * *